(12) United States Patent
Linhoff et al.

(10) Patent No.: US 11,686,359 B2
(45) Date of Patent: Jun. 27, 2023

(54) FRICTION RING FOR A BRAKE DISK AND RELATED METHODS

(71) Applicant: Continental Teves AG & Co. OHG, Frankfurt (DE)

(72) Inventors: Paul Linhoff, Neu-Anspach (DE); Sven Boden, Dresden (DE); Johann Jungbecker, Badenheim (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 16/685,211

(22) Filed: Nov. 15, 2019

(65) Prior Publication Data

US 2020/0080607 A1 Mar. 12, 2020

Related U.S. Application Data

(63) Continuation of application No. PCT/EP2018/061272, filed on May 3, 2018.

(30) Foreign Application Priority Data

May 19, 2017 (DE) .................. 10 2017 208 529.0

(51) Int. Cl.
  *F16D 65/12* (2006.01)
  *B23P 15/18* (2006.01)
  *F16D 65/02* (2006.01)

(52) U.S. Cl.
  CPC ............ *F16D 65/127* (2013.01); *B23P 15/18* (2013.01); *F16D 2065/1316* (2013.01)

(58) Field of Classification Search
  CPC ........ F16D 65/127; F16D 65/128; B23P 9/02; B23P 15/18

USPC ....... 188/18 A, 73.1, 218 A, 218 XL, 264 A, 188/264 AA; 192/107 M, 107 R; 29/527.2

See application file for complete search history.

(56) References Cited

U.S. PATENT DOCUMENTS

| | | | | |
|---|---|---|---|---|
| 2,464,913 | A | * | 3/1949 | Wildhaber .............. B23F 15/06 409/26 |
| 2,516,544 | A | * | 7/1950 | Breeze ...................... F16D 5/00 192/52.1 |
| 4,156,479 | A | * | 5/1979 | Kawamura ........... F16D 65/127 188/218 A |

(Continued)

FOREIGN PATENT DOCUMENTS

| CN | 1278873 A | 1/2001 |
|---|---|---|
| CN | 1523247 A | 8/2004 |

(Continued)

OTHER PUBLICATIONS

Search Report dated Jan. 31, 2018 from corresponding German Patent Application No. DE 10 2017 208 529.0.

(Continued)

*Primary Examiner* — Christopher P Schwartz

(57) ABSTRACT

A brake disk with a friction ring or to a friction ring, which comprises a PMMC (particle metal matrix composite), at least in the region of its friction surface. The friction surface of the friction ring is provided with mechanically applied microgrooves, which extend in a radial direction with respect to a circumferential direction of rotation of the friction ring, non-tangentially angled thereto.

14 Claims, 1 Drawing Sheet

(56) References Cited

U.S. PATENT DOCUMENTS

| | | | | |
|---|---|---|---|---|
| 4,262,452 | A | * | 4/1981 | Lopez .................... B24B 23/00 |
| | | | | 451/210 |
| 4,385,429 | A | * | 5/1983 | Crankshaw ............... B23P 9/02 |
| | | | | 192/107 R |
| 5,735,366 | A | * | 4/1998 | Suga ................. F16D 65/0006 |
| | | | | 188/218 XL |
| 5,765,667 | A | * | 6/1998 | Ross ....................... F16D 65/12 |
| | | | | 188/218 XL |
| 5,884,388 | A | * | 3/1999 | Patrick ..................... C23C 4/08 |
| | | | | 29/527.2 |
| 5,935,407 | A | | 8/1999 | Nenov et al. |
| 6,279,697 | B1 | | 8/2001 | Dickerson et al. |
| 6,821,447 | B1 | * | 11/2004 | Storstein ............... F16D 69/027 |
| | | | | 216/11 |
| 8,151,434 | B2 | * | 4/2012 | Fukao .................. B60B 27/001 |
| | | | | 29/557 |
| 10,183,690 | B2 | | 1/2019 | Minami et al. |
| 2004/0178026 | A1 | | 9/2004 | Runels |
| 2006/0081423 | A1 | * | 4/2006 | Daigre .................... B66D 5/14 |
| | | | | 188/71.5 |
| 2012/0037465 | A1 | * | 2/2012 | Abe .................... F16D 65/0037 |
| | | | | 188/73.1 |
| 2015/0027826 | A1 | | 1/2015 | Bill |
| 2016/0178019 | A1 | * | 6/2016 | Stephenson ........... F16D 65/127 |
| | | | | 188/218 XL |
| 2018/0223914 | A1 | * | 8/2018 | Hirota .................. F16D 13/648 |

FOREIGN PATENT DOCUMENTS

| | | |
|---|---|---|
| CN | 101520077 A | 9/2009 |
| CN | 102606659 A | 7/2012 |
| CN | 103075445 A | 5/2013 |
| CN | 103080583 A | 5/2013 |
| CN | 204004115 U | 12/2014 |
| CN | 105393023 A | 3/2016 |
| DE | 19505724 A1 | 8/1996 |
| DE | 19749162 A1 | 5/1999 |
| DE | 29522189 U1 | 8/2000 |
| DE | 60005655 T2 | 7/2004 |
| DE | 102009049875 A1 | 5/2011 |
| DE | 102011121292 A1 | 6/2013 |
| DE | 102015122325 A1 | 6/2016 |
| JP | 2010138985 A | 6/2010 |
| JP | 5126041 B2 | 1/2013 |
| WO | 95/27589 A1 | 10/1995 |

OTHER PUBLICATIONS

International Search Report and Written Opinion dated Sep. 19, 2018 from corresponding International Patent Application No. PCT/EP2018/061272.

Wang, Qian;Gao, Jianguo;Ma, Weimin / Development and application of metal matrix composites / Apr. 30, 2007.

Chinese Office Action dated Aug. 4, 2021 for the counterpart Chinese Application No. 201880033128.4 citing the Non-Patent Ligature submitted with this IDS.

* cited by examiner

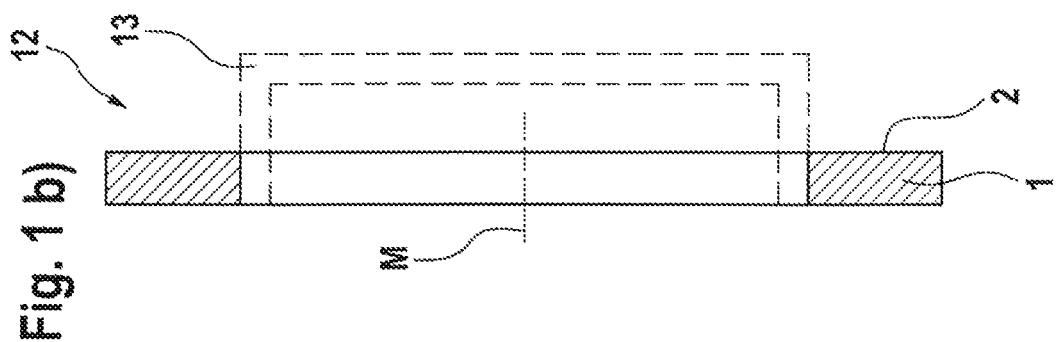
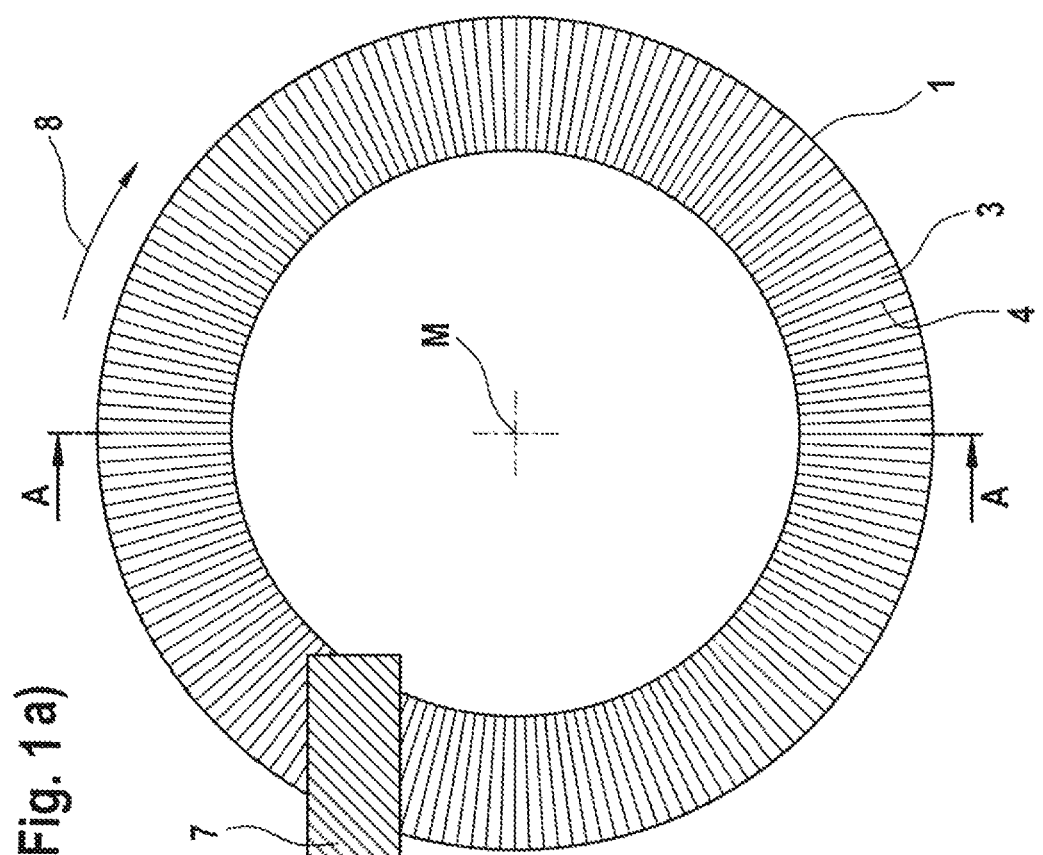
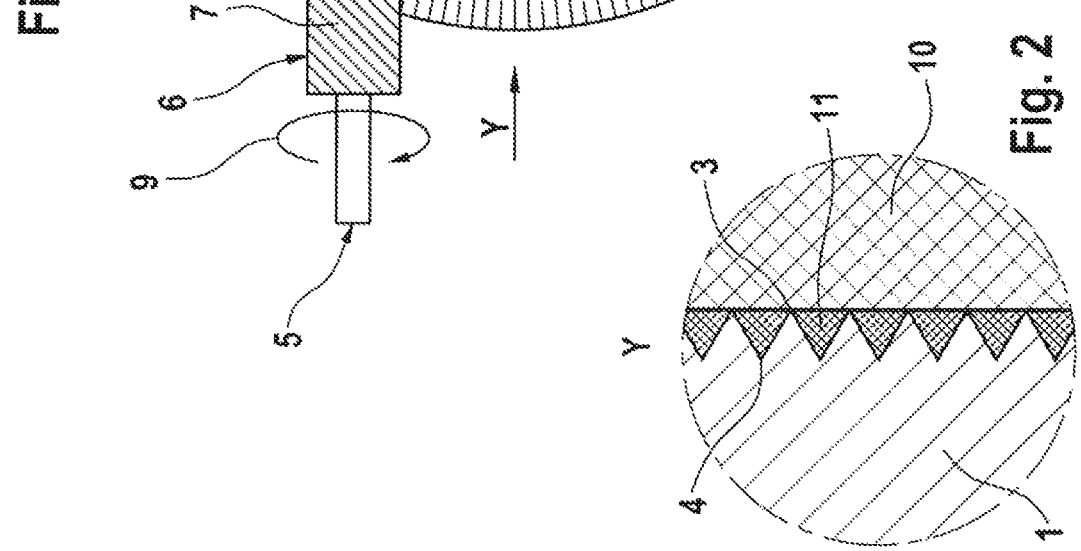

FRICTION RING FOR A BRAKE DISK AND RELATED METHODS

CROSS REFERENCE TO RELATED APPLICATIONS

This application is the U.S. national phase application of PCT International Application No. PCT/EP2018/061272, filed May 3, 2018, which claims priority to German Patent Application No. DE 10 2017 208 529.0, filed May 19, 2017, wherein the contents of such applications are incorporated herein by reference.

TECHNICAL FIELD

A friction ring for a brake disk and related methods.

TECHNICAL BACKGROUND

In the automobile industry, efforts are being made to reduce the weight of brake disks, and for this purpose to use, instead of for example the customary gray cast iron, materials that are lighter and nevertheless resistant, for example so-called PMMC (particle metal matrix composite) materials. A PMMC material is a composite alloy in which hard particles, such as in particular carbides or silicates, are embedded in a comparatively softer metal matrix or carrier material. Brake disks of the type in question, with friction rings or friction surfaces comprising or of a PMMC, are known in principle, for example from DE 19505724 A1 or DE 102011121292 A1. The PMMC used therein is an aluminum matrix composite alloy Al-MMC (aluminum metal matrix composite), also commonly known as particle-reinforced aluminum.

It is known that, in the case of friction pairings, comprising a friction ring and a friction lining, in which the friction ring consists of particle-reinforced aluminum (Al-MMC), the formation of the friction layer has a decisive influence on the performance and load-bearing capacity of the friction pairing. Immediately after production, however, such materials are not optimally suited for this, since the hard particles are mainly embedded below the surface and their roughness is therefore too low.

DE 60005655 T2 relates a method in which the friction surface of an Al-MMC brake disk is etched by means of an NaOH solution to expose the hard particles. However, this requires a work step involving dangerous corrosive substances, with corresponding complex equipment, safety precautions and additional cleaning measures. In addition, such exposed carbides tend to break out of the carrier material and also become lodged in the surface of the brake lining, whereby a change in the coefficient of friction of the tribological pairing and the wear can vary unpredictably over the service life.

SUMMARY

The disclosure relates to a friction ring for a brake disk, wherein the friction ring comprises a PMMC material (particle metal matrix composite), at least in the region of its friction surface, including a brake disk with such a friction ring and a surface production method for the friction surface.

Overall, a brake disk with the friction ring has the following advantages over the known prior art:

faster and more homogeneous formation of the friction layer without selective chemical conditioning of the friction surface, a higher performance a higher load-bearing capacity lower overall wear of the brake disk and brake linings over the service life.

Because the friction surfaces of conventional cast brake disks usually have to be machined in any case to remove the casting skin and/or adjust the nominal size, in comparison with DE60005655T2 the brake disk according to the embodiments herein obviate the need for an additional work step and with different types of equipment and procedures.

BRIEF DESCRIPTION OF THE DRAWINGS

FIG. 1(a) shows a schematic of the friction ring in plan view in the treatment of the friction surface according to one or more embodiments.

FIG. 1(b) shows a schematic of the friction ring in cross section with an only indicated brake disk chamber according to one or more embodiments.

FIG. 2 shows a schematic diagram of the friction surface in contact with a friction lining during braking operation according to one or more embodiments.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

A friction ring 1 of a finished brake disk 12 for a motor vehicle is designed as rotationally symmetrical to the center axis M. Friction ring 1 is arranged so as to run around in the circumferential direction of rotation 8, and in a multi-part manner, on a brake disk chamber 13 for rotation therewith, or connected/generated integrally therewith. The embodiments include where the friction ring 1 may be both made of solid material and also hollow, or internally ventilated, with friction surfaces 2 provided axially on both sides. A friction ring 1 as a lateral element, with a friction surface 2 provided axially only on one side, is conceivable, for attachment to a central ring element arranged axially offset for forming the brake disk 12.

The friction surface 2 is provided with a multiplicity of microgrooves 4, the depth of which is preferably provided in a defined manner in the range between almost around 0 to a few micrometers. A texturing (basic surface structure of the friction surface 2) is determined by the mechanical machining method used. For example, the microgrooves 4 are aligned in the radial direction obliquely or ideally orthogonally to the circumferential direction of rotation 8, and are produced by a correspondingly directed mechanical machining method. This is preferably performed by a skillful adaptation of machining parameters in a work step provided for setting the nominal thickness and nominal flatness of the friction ring 1. However, a separate extra process step exclusively for introducing microgrooves 4 is likewise possible.

Depending on the chosen cutting method (cutting movement performed a) from the workpiece or b) from the tool), a friction ring 1 is a) rotatably driven or b) clamped centrically, and fixed in terms of rotation, in the working space of a machine tool. By way of example, friction ring 1 or brake disk 12 can be moved with a defined feed in the circumferential direction of rotation. A tool 6 can rotate about its axis of rotation 5 and is infed to the friction surface 2 to be machined in order to machine its surface (remove it in some areas). The machining parameters, such as in particular the direction of tool rotation 9, cutting speed, feed, cutting direction with respect to the circumferential direction of rotation 8 and the feed direction and the tool shape are to be chosen so that the desired roughness, texture, surface tensions, and the defined alignment and orientation with respect to the circumferential direction of rotation 8 are achieved. To reduce the tool wear and produce a particularly uniform surface quality provided with small deviations, the feed of the friction ring 1 is preferably set in synchronism with the direction of tool rotation 9 as in the exemplary embodiment shown.

Production methods for introducing the defined structure that come into consideration are preferably chip-removing cutting methods with a defined tool edge such as, in particular, milling, specifically in particular hobbing, or turning and/or rotary milling, or methods with a tool edge offset statistically randomly on the tool, such as in particular grinding or honing. In view of a given, structural fragility or brittleness of hard material or hard material particles, it may be advantageous to additionally introduce for production-related reasons as far as possible no, or at most very minor, shear or compressive stress components into the workpiece surface, by means of an infeed rate that is for example halved, that is to say reduced gradually or reduced in a controlled manner, or by means of a feed rate that is halved, that is to say gradually reduced in a controlled manner, and/or in combination with, for example, doubly intensified coolant flow (l/min).

In an exemplary embodiment shown, arranged by way of example as a tool 6 is a hob with a position and orientation as for hobbing (involute shape) of the workpiece, as is otherwise actually only known for the production of helical gears. The residual roughness or surface structure produced by the cutting engagement of the teeth 7 is in the micrometer range and corresponds to the desired run-in roughness.

If the tool 6 and the friction ring 1 turn in mutually aligned directions and at a mutually coordinated or synchronous speed, this produces roughness peaks and valleys directed in a radially outwardly extending manner on the machined friction surface 2, as indicated in FIG. 2. Ideally, a sawtooth-like profile, as seen in cross section, is aimed for. The tips 3 of the roughness peaks act on an applied brake lining 10 in braking mode like machining cutting edges and during a run-in phase cause a time-limited, deliberately increased intended run-in lining wear, so that for a limited time abrasion particles are removed to an increased extent from the friction material of the brake lining 10, in order to apply or fuse this material to the micro-superficial gaps or valleys of the friction ring. The abrasion 11 is thereby gradually deposited in the valleys of the microgrooves 4 and fills them in or up. Thus, by material transfer in the micro range, a gradual leveling effect takes place, and after the elapsed run-in phase, even the tips 3 of the friction ring 1 are covered with the material of the brake lining 10. With completion of the run-in phase, the pairing with appropriate build-up of the application of the same friction material layer on the friction surface 2 of the friction ring 1 is completed, and the wear of the brake linings 10 or the friction ring 1/the brake disk 12 greatly decreases with lasting effect in the subsequent normal operating phase.

An improved brake disk or a friction ring with a reduced wear prognosis along with rationally optimized production is described herein.

In one or more embodiments, separating a run-in operating phase, which by means of targeted surface structuring is tribologically greatly improved, because accelerated, with the aid of transported, and therefore unilaterally or mutually accelerated, application of friction material to a friction ring/brake disk, even more efficiently than before from a subsequent normal operating phase.

In particular, by the mechanical introduction of microgrooves extending transversely to the circumferential direction of rotation of the brake disk, the surface structure of the friction surface is made to be so coarse and rasp-like that in this way a run-in roughness of the friction surface is temporarily selectively increased. This brings about a briefly greatly increased, well predictable, and then rapidly decreasing run-in wear of the brake linings, so as to bring about an accelerated and more homogeneous leveling and tribological layer application effect by applying the better-gripping friction layer of friction lining material to the friction surfaces of the friction ring. Once the application of the friction layer of friction material or the leveling has been completed with the running-in phase, only a reduced slight wear on the brake disk and the brake linings occurs during the following normal operating phase. This makes use of the effect that, by their embedding in the applied friction material, the hard material particles are less pre-damaged or exposed, for example in comparison with a chemical surface treatment, i.e. etching. As a consequence, according to the invention there is advantageously no pre-damage of the composite, and the hard particles remain unaffected, without any damage, embedded in their carrier material matrix.

LIST OF REFERENCE NUMERALS

1 Friction ring
2 Friction surface
3 Tip
4 Microgrooves
5 Axis of rotation
6 Tool
7 Cutting teeth
8 Circumferential direction of rotation
9 Direction of tool rotation
10 Brake lining
11 Abrasion
12 Brake disk
13 Brake disk chamber
M Center axis

The invention claimed is:

1. A friction ring for a brake disk comprising:
  at least one friction surface configured for interacting with a brake lining, wherein the friction ring comprises an Al-MMC in one of at least in the region of the friction surface and the friction ring consisting completely thereof;

the at least one friction surface has a plurality of microgrooves which extend in a radially directed manner with respect to a circumferential direction of rotation of the friction ring and non-tangentially angled thereto; and wherein the microgrooves are arranged orthogonally to the circumferential direction of rotation.

2. The friction ring as claimed in claim 1, wherein the microgrooves are introduced into the friction surface by a mechanical removing or forming method.

3. The friction ring as claimed in claim 1, wherein the microgrooves are arranged close to one another in the circumferential direction in such a way that in cross section a sawtooth-like profile with directly adjacent roughness peaks and roughness valleys is formed.

4. The friction ring as claimed in claim 1, wherein the microgrooves have a sawtooth cross section and are arranged adjacent to one another in the circumferential direction such that adjacent microgrooves have a common sawtooth peak therebetween.

5. The friction ring as claimed in claim 1, wherein the friction ring comprises a second friction surface facing in an opposing axial direction from the first friction surface, wherein a second plurality of microgrooves are defined on the second friction surface, and wherein the second plurality of microgrooves extend in the radial direction with respect to the circumference of the friction ring.

6. The friction ring as claimed in claim 1, wherein the plurality of microgrooves have a predetermined depth based upon a desired amount of material transfer from a braking lining to fill the valleys of the microgrooves.

7. A method for machining the friction surface of a friction ring, the friction ring having at least one friction surface configured for interacting with a brake lining, wherein the friction ring comprises an Al-MMC material in at least one of in the region of the friction surface and the friction ring consisting completely thereof and comprising:

moving the friction ring by a defined feed in the circumferential direction of rotation; and machining the friction surface with a tool rotating in a direction of tool rotation, wherein a plurality of microgrooves that extend radially with respect to the circumferential direction of rotation of the friction ring and non-tangentially angled thereto are thereby introduced into the friction surface, wherein the microgrooves are arranged orthogonally to the circumferential direction of rotation.

8. The method as claimed in claim 7, wherein the feed of the friction ring and the direction of tool rotation take place is in synch.

9. The method as claimed in claim 7, wherein the tool is a milling tool.

10. The method as claimed in claim 7, wherein the tool is a hob.

11. The method as claimed in claim 7, wherein the tool is a grinding tool.

12. The method as claimed in claim 7, further comprising removing friction ring material by chip removal to form the microgrooves and define a nominal thickness of the friction ring.

13. The method as claimed in claim 7, wherein machining the friction surface further comprises forming the microgrooves to have a sawtooth cross section where adjacent microgrooves have a common sawtooth peak therebetween.

14. The method as claimed in claim 7, wherein the plurality of microgrooves are formed to a predetermined depth based upon a desired amount of material transfer from a braking lining to fill the valleys of the microgrooves.

* * * * *